Dec. 10, 1929.   R. B. FAGEOL   1,739,450

MULTIWHEEL ROAD VEHICLE

Original Filed April 23, 1923

Inventor
Rollie B. Fageol
William A. Strauch
By
Attorney

Patented Dec. 10, 1929

1,739,450

UNITED STATES PATENT OFFICE

ROLLIE B. FAGEOL, OF LOS ANGELES, CALIFORNIA, ASSIGNOR TO EIGHT WHEEL MOTOR VEHICLE COMPANY, OF SAN FRANCISCO, CALIFORNIA, A CORPORATION OF CALIFORNIA

MULTIWHEEL ROAD VEHICLE

Original application filed April 23, 1923, Serial No. 633,867. Divided and this application filed October 16, 1928. Serial No. 312,868.

This invention relates to a road vehicle, more particularly, the invention relates to the running gear and spring suspension for vehicles. The present application is a division of application Serial No. 633,867, filed April 23, 1923, now Patent No. 1,692,891 of November 27, 1928.

In the operation of vehicles, particularly of the multiwheel type, due to road irregularities, the frame is subject to shocks resulting in uncomfortable riding and further, the frame and spring suspensions are subject to shocks and strains that in time assume a destructive character.

It is accordingly a primary object of the present invention to provide running gear for a vehicle which will yield to and absorb shocks without substantially transferring such shocks to the body of the vehicle.

A further object of the invention is the provision of a spring suspension for a road vehicle which provides substantially improved riding qualities of the vehicle.

A still further object of the invention is the provision of a four-wheeled truck construction for road vehicles in which each wheel may yield to road irregularities without substantially transmitting shocks and strains to the frame of the vehicle.

A still further object of the invention is the provision of yieldable means to provide for longitudinal cushioning between a vehicle frame and a truck to reduce strains and shocks due to acceleration and deceleration.

A still further object of the invention is the provision in a road vehicle of a four-wheeled truck in which the axles thereof are permitted slight relative cushioned bodily movement without producing strains in the truck frame or vehicle frame by beams that interconnect and position the axles, the one relative to the other.

A still further object of the invention is the provision in a road vehicle of a four-wheeled truck construction which will minimize the transfer of road shocks from the road engaging wheels to the vehicle frame.

With the above objects in view, as well as others, that will become apparent from the following disclosure, reference will be had to the accompanying drawing, forming part of same, and in which.

The truck construction and associated spring suspension constituting my present invention are applicable to the rear truck of a six-wheeled vehicle employing one four-wheeled truck and to either front or rear truck of an eight-wheeled vehicle employing two four-wheeled trucks. The invention is shown in connection with an eight-wheeled vehicle having a four-wheeled front truck, the wheels of which are dirigible for steering the vehicle. Said vehicle may also be provided with a four-wheeled rear truck, the wheels of which are driven for propelling the vehicle and said truck may be constructed and connected to the frame in a manner such as will presently be described.

Figure 1:
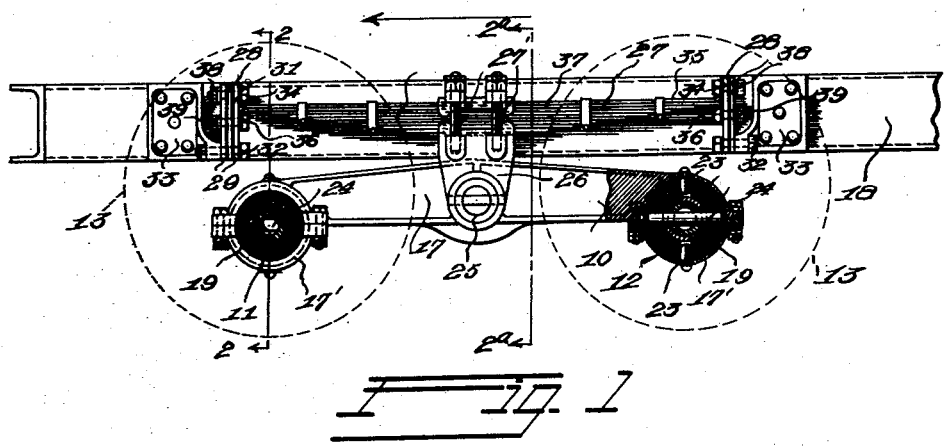
Figure 1 is a longitudinal sectional view of a front four-wheeled truck taken on a plane represented by the line 1—1 in Figure 2, the vehicle frame being shown in elevation and a portion of the structure being broken away to disclose certain details of construction.
Figure 2:
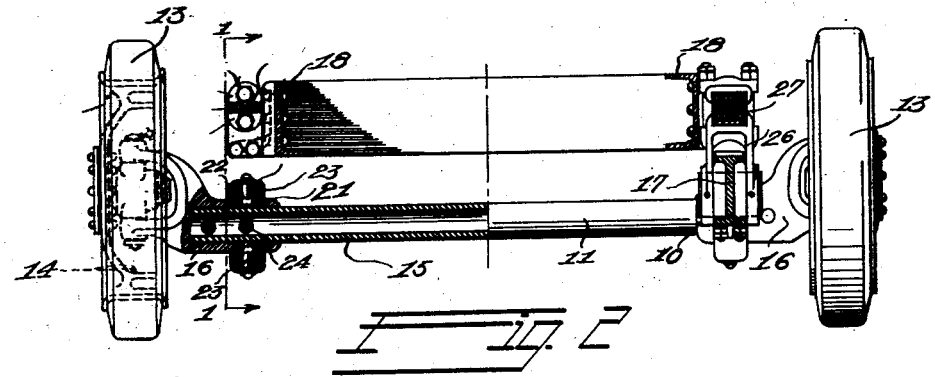
Figure 2 is a transverse sectional view, the left hand portion of which being taken on a plane represented by line 2—2 in Figure 1, and the right hand portion of which being taken on a plane represented by line $2^a$—$2^a$ in Figure 1.

Referring to the drawings by reference characters, in which like characters designate like parts, 10 designates a front vehicle truck construction in accordance with my invention and which as indicated in Figures 1 and 2 comprises a pair of parallel longitudinally spaced axles 11 and 12 each being provided at the opposite ends thereof with road engaging wheels 13. These wheels, while illustrated as steering wheels may be driving wheels when utilizing the invention as a rear vehicle truck as above stated. Preferably all of the wheels, steering and driving, are provided with brake drums 14 in order that all of the wheels of the vehicle may be subjected to a braking effect. The axles are preferably of tubular formation as indicated at 15 having forged yokes 16 secured to the opposite ends thereof, the yokes being formed in well known manner and as illustrated in Figure 2 to receive the front wheel vertical pivot pins. The spacing of the tread of the wheels on the same axle readily may be varied by varying the length of tubular axles 11 and 12.

The axles 11 and 12 of the truck 10 are connected together in spaced normally parallel relation by means of a pair of rigid bolsters or beams 17, one of which is disposed at each of the opposite sides of the vehicle frame 18 as clearly indicated in Figure 2.

In order to relieve the bolsters and accordingly the vehicle frame and parts carried thereby of destructive shocks and strains when the wheels encounter irregularities in the road way, provision is made for movement of the axles independently of each other and relative to the bolsters 17. The construction is such that the respective axles 11 and 12 are permitted to assume varying angular positions in a vertical plane, with respect to each other and are also permitted a slight rotation with respect to each other, thus minimizing strains in either bolster when one end of either axle is raised due to the wheel carried thereby passing over an elevation in the roadway.

This is accomplished by providing resilient connections between the axles and bolsters which comprises a block of resilient material 19, such as rubber, positioned in a seat defined by a circumferential groove 21 in each yoke 16 and an opposing channel 22 in the respective end of bolster 17, the seats for blocks 19 are accessible by means of caps 17' detachably secured to bolsters 17. The blocks 19 are restrained against rotation within said seats by means of pins 23 secured in bolsters 17 and projecting into corresponding apertures in blocks 19. Extending through each axle at right angles to the pins 23 at each end thereof is a pin 24, which also extends into the block 19 preventing rotation of the axle relative to the block.

It will thus be seen that sections of each block 19 are confined between pins 23 and 24 which due to the yieldable nature of the block provide for a slight yieldable universal movement of the axles relative to the bolsters. The blocks 19, due to their disposition as disclosed between the axles and bolsters permit the axles to assume varying angular positions in a vertical plane, by slightly deforming the blocks, without subjecting the bolsters to substantial strains.

Each bolster 17 is pivotally supported centrally of the ends thereof such that the truck may oscillate as the wheels encounter obstructions in the roadway. Each bolster is pivotally mounted on a stub shaft or pintle 25 carried by a bracket 26 which is suitably secured to the center of a load carrying leaf spring assembly 27 by means of U-bolts 27'. There is a load supporting spring at each side of the vehicle frame 18 as will be readily understood. It will be observed that the length of the spring 27 exceeds the distance between the axles and that by this construction it is feasible to employ springs of substantial length providing the necessary flexibility.

Figure 3:
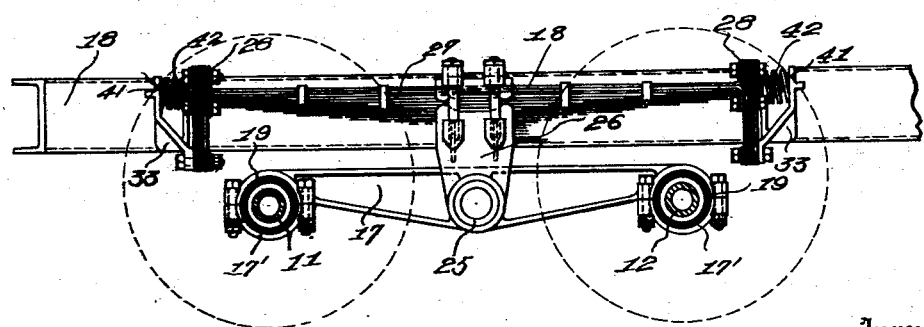
Figure 3 is a view similar to Figure 1 depicting a modification of the invention.

In order to minimize the amount of to and fro motion transferred to the frame 18 due to vertical movement of one of the axles, as when the wheels carried thereby pass over an elevation in the roadway, the axes of pintles 25 are disposed in a plane of the axes of axles 11 and 12 at the points where they pass through blocks 19, as is shown in Figure 3. If desired, the axes of pintles 25 may be disposed in the plane of the axes of rotation of wheels 13. By the provision of rigid bolsters, the distance between the two axles is maintained substantially constant, so that steering of the vehicle is not adversely affected, due to a constantly varying difference in distance between the axles, as occurs when the axles are interconnected by leaf springs.

In order to provide for ready flexing of the springs 27 under varying loads carried by the vehicle, the opposite ends of springs 27 are connected to the vehicle frame 18 by means of efficient flexible shackles 28 comprising strips of fabric 29 and alternating thin strips of steel 31 which provides a strong and flexible construction requiring no lubrication and practically free from wear.

The shackles 28 are secured at the lower end thereof by means of bolts 32 to brackets 33 secured to frame 18 and the ends of springs 27 are secured to the shackles 28 above the points of connection between shackles 28 and brackets 33 to permit of the flexing action of shackles 28. The connection between each spring 27 and associated shackles 28 comprises upwardly directed end flanges 34 on the upper leaf 35 of spring 27 and downwardly directed end flanges 36 on the second leaf 37 of spring 27 which flanges abut the adjacent opposed surfaces of shackles 28 and are respectively secured thereto by bolts 38 and 39.

Due to the curvature of the bends between leaves 35 and 37 and flanges 34 and 36, the two upper leaves 35 and 37 are permitted slight sliding movement with respect to each other as the flexure of the spring varies.

By connecting the opposite ends of springs 27 to frame 18 by flexible shackles in the manner disclosed, the frame is permitted a limited longitudinal movement with respect to the springs, which provides cushioning movement during acceleration and deceleration of the vehicle. This yieldable longitudinal movement relieves the frame of strains and shocks and provides an easy riding vehicle. In order to dampen this longitudinal swinging movement, after it has been initiated, means may be provided to cushion the shackles 28 and thus cause a substantially rapid retardation of the swinging movement as well as providing a cushioning means for the longitudinal movement of the frame relative to the springs.

This is carried out by means of the modified construction shown in Figure 3 in which brackets 33 are provided with backing walls 41 between which and the shackles 28 are disposed coiled springs 42 which are normally under slight compression. These springs 42 are alined with the upper leaves of the leaf spring assemblies 27 and serve to cushion the longitudinal swinging movement of the spring assemblies relative to the frame as well as dampening such movement.

From the foregoing disclosure, it will be seen that a running gear and spring suspension for vehicles is provided which is durable, comparatively simple in construction, and which functions admirably to cushion all the movements resulting from the wheels encountering obstructions in the road-way and to eliminate the otherwise injurious shocks and strains to the vehicle frame and associated parts.

The invention may be embodied in other specific forms without departing from the spirit or essential characteristics thereof, and the present embodiment is therefore to be considered illustrative rather than restrictive, the scope of the invention being indicated by the appended claims, and all changes that come within the meaning and range of equivalency of the claims are intended to be embraced therein.

What I claim as new and desire to secure by United States Letters Patent is:—

1. A vehicle comprising a pair of substantially parallel axles; rigid means having the ends thereof supported from said axles by means including cushioned connections; a member pivotally supported from the mid portion of said rigid means; a leaf spring supported at its mid portion from said member; a flexible shackle supported from each end of said spring; and a frame supported movably with relation to said spring from said shackles.

2. The combination set forth in claim 1 in which said cushioned connections comprise resilient blocks interposed between said rigid means and said axles and interlocked against rotation relative thereto.

3. In a road vehicle; a pair of substantially parallel axles; rigid means interconnecting said axles and connected thereto by connections permitting universal movement of each of said axles with relation to said means; a bracket pivotally supported from the mid portion of said means; a leaf spring supported at its mid portion from said bracket; yielding shackles supported from each end of said spring; and a frame supported from said yielding shackles.

4. The combination set forth in claim 3 in which said yielding shackles have coiled springs reacting against them to control their flexible movement.

5. In a road vehicle; a pair of substantially parallel axles; rigid means having the ends thereof supported from said axles by deformable blocks for permitting cushioned movement of each of said axles in relation to said means; a bracket pivotally supported from the mid portion of said means; a leaf spring supported at its mid portion from said bracket; resilient connections from each end of said spring; and a frame supported from said connections.

6. In a road vehicle, a pair of substantially parallel axles; housings carried by each of said axles and connected thereto by means including deformable blocks such that limited cushioned movement of each axle relative to the housing carried thereby is permitted; rigid means interconnecting said housings; brackets pivoted to said rigid means; the axis of the pivot being substantially below the horizontal plane that contains the axes of rotation of the wheels carried by said axles; and resilient means interconnecting said brackets and the vehicle frame.

7. In a road vehicle, a pair of substantially parallel axles; rigid means disposed transversely of said axles adjacent the ends thereof; housings carried by said rigid means in surrounding and spaced relation to said axles; deformable cushioning means disposed in said housings and in engagement with said axles; brackets pivotally connected to said rigid means intermediate the ends thereof; leaf springs secured at the mid portions thereof to said brackets; and connections between the opposite ends of said springs and the vehicle frame, said connections including shackles permitting deflection of said springs.

8. The combination set forth in claim 7 in which said deformable cushioning means are connected with said housings and said axles respectively to prevent rotation thereof.

9. In a road vehicle, a pair of substantially parallel axles; housings surrounding and spaced from said axles adjacent the opposite ends thereof; deformable cushioning means disposed within said housings in engagement with said axles; rigid means connecting said housings; brackets pivotally connected to said rigid means intermediate the ends thereof; springs carried by said brackets; said springs being flexibly connected at their ends to the vehicle frame.

10. The combination set forth in claim 9 in which said axles and said housings are provided with aligned seats for said deformable cushioning means; pins carried by said axles; and pins carried by said housings in angular relation to said first pins; said pins engaging said cushioning means for preventing bodily movement of said last named means relative to said axles and said housings.

11. In a road vehicle construction, a chassis frame; a truck supporting one end of said frame, said truck comprising a pair of tandem axles, rigid beams interconnecting said axles to space them with respect to each other longitudinally of the frame, brackets disposed between the axles, said beams having trunnion mountings on said brackets on a transverse axis disposed approximately in the horizontal plane of the axles, leaf springs of substantially greater length than the distance between the axles securely supported on said brackets, and means interconnecting the ends of said springs and the frame, said means including a flexible shackle between at least one end of each spring and the frame.

12. In the vehicle construction defined in claim 11, said springs being approximately straight and said shackles comprising elongated flexible elements normal to the springs.

13. In a road vehicle construction, a chassis frame; a truck supporting one end of said frame, said truck comprising a pair of tandem axles, substantially rigid beams interconnecting said axles to space them with respect to each other longitudinally of the frame, brackets disposed between said axles and having trunnion mountings to support them on said beams on a transverse axis, springs supported on said brackets and secured to the frame by shackles, whereby the springs, beam and axles are capable of movement as a unit longitudinally of the frame, and means resisting said longitudinal movement.

14. In a road vehicle construction, a chassis frame; a truck supporting one end of said frame, said truck comprising a pair of tandem axles, substantially rigid beams interconnecting said axles to space them with respect to each other longitudinally of the frame, brackets disposed between said axles and having trunnion mountings to support them on said beams on a transverse axis, springs supported on said brackets at their mid portions and having their ends connected to said frame, and means associated with said axles to prevent them from rotating about their axes within said interconnecting beams while permitting them to tilt with respect to said beams in substantially transverse vertical planes.

15. In a road vehicle construction, a chassis frame; a truck supporting one end of said frame, said truck comprising a pair of tandem axles, substantially rigid beams interconnecting said axles to space them with respect to each other longitudinally of the frame, brackets disposed between said axles and having trunnion mounts to support them on said beams on a transverse axis, springs supported on said brackets at their mid-portions and having their ends connected to the frame, and devices interconnecting the ends of said beams with said axles to permit limited universal movement of the latter with respect to the former, said devices comprising deformable blocks which are bodily immovable with respect to the beams and the axles.

In testimony whereof I affix my signature.

ROLLIE B. FAGEOL.